United States Patent [19]

Kakimoto

[11] 4,330,159
[45] May 18, 1982

[54] PNEUMATIC BEARING ARRANGEMENT
[75] Inventor: Masakazu Kakimoto, Aichi, Japan
[73] Assignee: Ushio Air Tool Co., Ltd., Aichi, Japan
[21] Appl. No.: 193,440
[22] Filed: Oct. 3, 1980
[30] Foreign Application Priority Data Feb. 17, 1979 [JP] Japan .................................. 54-17713

[51] Int. Cl.³ ............................................ F16C 32/06
[52] U.S. Cl. ........................................ 308/9; 308/122; 308/170; 308/DIG. 1
[58] Field of Search ..................... 308/9, DIG. 1, 122, 308/170, DIG. 15, 93, 107

[56] References Cited
U.S. PATENT DOCUMENTS

| | | | |
|---|---|---|---|
| 3,391,965 | 9/1968 | Lindeboom | 308/170 |
| 3,399,001 | 8/1968 | Whitaker | 308/170 |
| 3,917,366 | 11/1975 | Mason | 308/122 |
| 4,069,990 | 1/1978 | Rodgers et al. | 308/DIG. 1 |

*Primary Examiner*—Lenard A. Footland
*Attorney, Agent, or Firm*—Sandler & Greenblum

[57] ABSTRACT

A pneumatic bearing arrangement comprising an outer element and an inner element which both have generally conical configurations. The elements also have concave and convex bearing surfaces, respectively. The elements are disposed in generally concentric relation and define a generally conical bearing space therebetween. A plurality of nozzles are provided on the elements and open adjacent to the bearing surfaces of the elements. A shaft having a generally conical journal member with an inner and outer face is rotatably supported by the bearing space such that a gap exists between the journal and the inner and outer bearing surfaces. When air is jetted into the bearing space through the nozzle air films are created for maintaining the journal floating between the bearing surfaces without contacting either of the surfaces. The outer element, inner element and journal member can be formed with a substantially bell-shaped configuration to increase the bearing surface for both thrust and radial loads. A plurality of journal members can be provided at spaced locations along a shaft which are accommodated by respective pairs of outer and inner elements spaced along the arrangement. The journal members are maintained in a balanced position within the bearing spaces.

37 Claims, 5 Drawing Figures

PNEUMATIC BEARING ARRANGEMENT

BACKGROUND OF THE INVENTION

1. Field of the Invention

The present invention generally relates to a pneumatic bearing arrangement and more specifically to a pneumatic bearing arrangement in which outer and inner conical elements are separated by a bearing space and a journal member of a shaft is rotatably and floatably supported within the space.

Generally, most shaft bearings for high speed rotational elements employ either a ball or roller bearing or a hydraulic bearing which is operable to hydraulically form high pressure forced oil films about the periphery of a journal section of a shaft in order to rotatably support the section in floating fashion. For even greater, extra-high speed rotational regions which must support a journal section, bearings utilizing repulsive magnetic forces and pneumatic bearings utilizing pneumatic forces, which both reduce frictional resistance of the bearings against shaft rotation to a minimum, are utilized.

The arrangement of the present invention involves a pneumatic bearing arrangement particularly useful for application in the extra-high speed rotational regions referred to hereinabove. As used throughout this specification, the phrase "pneumatic bearing arrangement" defines the combined structure of a pneumatic bearing and a journal section or member or other part of a shaft.

2. Description of Prior Art

Conventional pneumatic bearing arrangements exist in which compressed air is jetted into a very small gap between a cylindrical bearing member and a journal section or member of a solid shaft which is rotatably positioned within the bearing member in floating fashion by air films formed by the jetted, compressed air. These conventional arrangements are both theoretically and structurally analogous to the hydraulic bearings referred to hereinabove, the only difference being that compressed air is used in the conventional pneumatic arrangements whereas pressurized oil is utilized in the hydraulic bearings.

In order for conventional pneumatic bearing arrangements to satisfactorily function in extra-high speed rotational situations, however, these arrangements must operate so as to support a journal member or section in a contactless, floating condition which will exist even when both radial and thrust loads are applied to the journal section or member, i.e., the structure must be capable of bearing loads both in the radial and thrust directions and meet the apparently structurally contradictory requirements that the journal section or member have a reduced mass or weight and an increased total pressure receiving area, insofar as is possible.

Additionally, such pneumatic bearing arrangements must be provided with means for preventing axial removal of the shaft connected to the journal, the shaft conventionally comprised by a diametrically extending flange on the shaft and a thrust bearing which receives the flange in order to bear the thrust load applied to the shaft. Consequently, such bearing is enlarged and elongated and the mass or weight of the journal section is increased due to the presence of the flange; furthermore, air circuitry within the thrust bearing is complicated by the added parts.

Alternately, even if the journal section or member is provided with a deformation so as to have a substantially angular cross-section for enabling the section or member to bear both radial and thrust loads, the section or member is still formed as a solid shaft and has a relatively large mass or weight by itself. Additionally, if the diameter or length of the journal section or member is increased in order to desireably increase its total pressure receiving area, the mass of the section is also further increased, thereby failing to satisfy the hereinabove referred to desireable structural requirements; accordingly, the practical functions desired to be met by the arrangement cannot be satisfactorily achieved.

Accordingly, conventional pneumatic bearings may be adapted for use in raised speed situations within a speed range determined by the substitution of compressed air for the pressurized oil of hydraulic bearings; this arrangement, however, lacks the lubricating function/application achieved at extra-high speeds by hydraulic bearings.

SUMMARY OF THE INVENTION

Accordingly, it is a general object of the present invention to provide a new and improved pneumatic bearing arrangement for rotatably supporting a journal member or section of a shaft in floating fashion.

It is an additional object of the present invention to fundamentally improve the lubricating structure of conventional pneumatic bearing arrangements as described hereinabove and to provide a compact, short and small pneumatic bearing arrangement which operates effectively in both medium and highspeed rotational regions and particularly in extra-high speed rotational regions. Furthermore, the arrangement is excellent in its performance both upon starting and stopping the shaft. These goals are achieved by a new and improved pneumatic bearing arrangement which comprises a structure for bearing both radial and thrust loads, which arrangement includes a combined pneumatic bearing and journal section or member having a reduced mass and an increased pressure receiving area such that, in distinction to conventional pneumatic bearing arrangements, the journal section can be supported in a completely contactless, floating condition so as to bear both radial and thrust loads and drastically reduce frictional resistance against rotation of the journal section or member.

It is an additional object of the present invention to provide a new and improved pneumatic bearing arrangement which satisfies the generally contradictory practical requirements that the journal section or member rotating within the arrangement have a reduced mass or weight but also a relatively large total pressure receiving area.

A still further object of the present invention is to provide a new and improved pneumatic bearing arrangement in which the journal section or member itself comprises means for hindering axial removal of a rotatable shaft from the bearing.

Other objects and advantages of the arrangements of the present invention will become apparent upon further review of the specification and claims.

In accordance with the present invention, a pneumatic bearing arrangement is provided which comprises outer and inner elements having substantially conical concave and convex bearing surfaces, respectively. The concave and convex bearing surfaces are disposed in opposed concentric relation to define thereby a conical, barrel-shaped bearing space. Each of the inner and outer elements has a plurality of nozzles formed therein at a plurality of positions; the nozzles open along the bearing surface of each element. A conical, substantially barrel-shaped journal part or member having an inner and outer face is provided on a shaft member and together they have a substantially Y-shaped cross-sectional configuration; this journal member is accommodated within and rotatably supported by said bearing space such that very small gaps remain between the outer face and the concave bearing surface and between the inner face and the convex bearing surface. Compressed air is jetted into the bearing space through the nozzles, which open along the outer and inner bearing surfaces. This compressed air creates air films which support the journal member in floating fashion so that the journal does not contact the bearing surfaces at all; this air film support bears both thrust and radial loads applied to the journal member of the shaft when it is in a relatively stable or balanced position so that the shaft will remain in such a position.

The journal member or section of the shaft may comprise either an integral portion of the shaft obtained by appropriately forming one end of the shaft or a separate element shaped into a conical barrel and integrally secured to the shaft member by force fitting. The journal member preferably has a uniform thickness wall formed as thin as possible as long as it can still endure and support a predetermined load. This both reduces the mass or weight of the journal section or member and equalizes both its outer and inner faces, i.e., equalizes the outer and inner pressure receiving areas of the journal member for facilitating the desired balancing or equalization of air pressure on the outer and inner faces of the journal member. Such balancing or equalization enables the journal member to be floatably supported.

In accordance with one aspect of the present invention, the pneumatic bearing arrangement comprises a combination of one conical, barrel-shaped bearing space defined by cooperating outer and inner bearing surfaces with one conical barrel-shaped journal section accomodated and supported within the space.

In accordance with another aspect of the present invention, the pneumatic bearing arrangement comprises a plurality of axially spaced combinations of the bearing space and journal section described above, i.e., a plurality of conical, barrel-shaped bearing spaces each of which is defined by a pair of outer and inner bearing surfaces disposed in spaced relation along the axial direction. In this arrangement the shaft includes a plurality of conical, barrel-shaped journal members disposed at axially spaced positions along the shaft. Each of the journal members is accordingly rotatably supported within a respective one of the bearing spaces such that very small gaps are left between the outer face of each journal member and a corresponding concave bearing surface and between an inner face of each journal member and a corresponding convex bearing surface. By so constructing the pneumatic bearing arrangement, the load strength of the journal section is further increased.

The nozzles described hereinabove either open directly at and along the outer and inner bearing surfaces or at and along longitudinal grooves (recesses) formed along the bearing surfaces. By opening at the grooves, the number of nozzles can be reduced, thereby improving productivity and/or efficiency of the journal members and promoting uniform distribution of air pressure over each journal member. In both cases, the nozzles open adjacent to the bearing surfaces.

The pneumatic bearing arrangement of the present invention is provided in another aspect thereof by an outer element having a substantially conical configuration and a concave bearing surface and an inner element having a substantially conical configuration and a convex bearing surface. The elements are disposed in generally concentric relation and define a generally conical bearing space therebetween. A plurality of nozzles are provided on each element which open adjacent to said bearing surfaces. A shaft having a generally conical journal member with an inner and an outer face is provided and is configured such that the shaft and member have a substantially Y-shaped cross sectional configuration. The journal member is rotatably supported by the bearing space such that gaps exist both between the outer face and the concave bearing surface and between the inner face and the convex bearing surface. When air is jetted into the bearing space through the nozzles, air films are created which serve to support and maintain the journal floating between the bearing surfaces without contacting either of the bearing surfaces, the air film maintaining the journal member in a balanced, contactless position even during the application of thrust and radial loads.

The pneumatic bearing arrangement of the present invention is provided for in a yet another aspect thereof by an arrangement of elements adapted to receive a shaft and journal member to support the same. The arrangement includes an outer element having a substantially conical configuration and a concave bearing surface and an inner element having a substantially conical configuration and a convex bearing surface. The elements are disposed in generally concentric fashion and define a generally conical bearing space therebetween. A plurality of nozzles are provided on each element which open adjacent to said bearing surfaces. The elements receive a generally Y-shaped shaft and journal member combination, the journal member having an inner and outer face. The elements are adapted to accomodate and rotatably support the journal in the bearing space so that very small gaps will be left between the outer face and the concave bearing surface and between the inner face and the convex bearing surface. When air is jetted into the bearing space through the nozzles, air films are formed or created which are adapted to support the journal member in floating fashion between the bearing surfaces without any contact between the bearing surfaces and the journal member. The air films are adapted to maintain the journal member in a balanced or stable position within the gaps even upon the application of both thrust and radial loads to the members.

BRIEF DESCRIPTION OF THE DRAWINGS

The above and other objects, features and advantages of the present invention will be more fully apparent to those of ordinary skill in the art to which this invention pertains from the following detailed description, when considered in connection with the accompanying drawings, in which like reference numerals designate like or corresponding parts throughout the several views, and wherein.

DETAILED DESCRIPTION OF THE DRAWINGS

Referring more specifically to the drawings, preferred embodiments of the present invention will hereinafter be described in detail with specific reference to the accompanying drawings.

Figure 1:
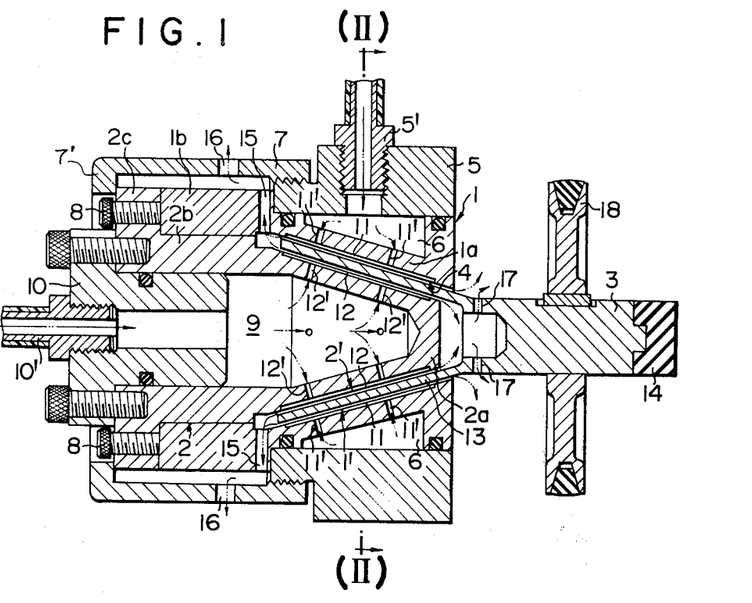
FIG. 1 is a vertical sectional view of a pneumatic bearing arrangement formed in accordance with the present invention.

Referring first to FIG. 1, it illustrates a first preferred embodiment of the pneumatic bearing arrangement which includes outer bearing element 1, inner bearing element 2 and shaft 3.

Outer bearing element 1 includes outer hollow receiver section 1a, formed as a generally conical element, and a generally cylindrical barrel section 1b integrally and contiguously connected to an enlarged or expanded end of the outer receiver section. The conical inner surface of outer receiver section 1a provides outer concave bearing surface 1' of the outer bearing element.

"Conical" as used throughout this application is considered to include conical, frustoconical and all other similar configurations having curved shape or tapered shape, or both.

Inner bearing element 2 includes inner hollow receiver section 2a having a generally conical configuration similar to but smaller than outer bearing surface 1' and a generally cylindrical barrel section 2b which is integrally and contiguously connected to an enlarged or expanded end of inner receiver section 2a. The conical outer surface of the inner receiver section provides a substantially convex inner bearing surface 2' of the inner bearing element.

Inner bearing element 2 is concentrically positioned within outer bearing element 1 such that barrel section 2b of the inner bearing element fits within barrel section 1b of the outer bearing element. Inner bearing element 2 includes flange 2c on the outer end of barrel section 2b; this flange abuts against an outer end face of barrel section 1b of the outer bearing element to position receiver section 1a of the outer bearing element with respect to receiver section 2a of the inner bearing element such that inner bearing surface 1' is oppositely disposed from outer bearing surface 2'.

Accordingly, bearing space 4 is created as defined by the space between outer and inner bearing surfaces 1' and 2' of the outer and inner bearing elements, respectively, and has a substantially conical configuration.

Along the outer receiver section of the outer bearing element an outer periphery is formed which includes an annular groove therein as represented by the generally trapezoidal areas in FIG. 1. Outer wall ring 5 is fitted onto receiver section 1a of the outer bearing element such that it covers the outer periphery of the outer receiver section in air tight fashion to define air passage 6, together with the grooved outer periphery of the outer receiver section.

Outer wall ring 5 has an end face axially engaged with an end face of barrel section 1b of the outer bearing element. Fastening ring 7 is threadedly screwed onto the outer wall ring.

Fastening ring 7 includes an inwardly extending flange edge 7' at its outer end. The flanged edge has an inner face which engages an outer end face of barrel section 2b of inner bearing element 2.

If fastening ring 7 is screwed onto outer wall ring 5 in its fastening direction, barrel sections 1b and 2b of the outer and inner bearing elements 1 and 2, respectively, will be clamped between outer wall ring 5 and flanged edge 7' of fastening ring 7 such that the bearing elements are assembled into a fixed, integral structure. If, on the other hand, fastening ring 7 is turned in its loosening direction and removed from outer wall ring 5, then inner bearing element 2 can be pulled away and separated from outer bearing element 1.

Inner bearing element 2 also includes adjusting screws 8 screwed into flange 2c of the inner bearing element and which engage an outer end face of barrel section 1b of outer bearing element 1. Turning both screws 8 and fastening ring 7 serves to move inner bearing element 2 within outer bearing element 1 over a small distance in the axial direction (dependent upon the direction of turning) either from or towards outer bearing element 1. In this fashion a clearance can be established or adjusted between the outer and inner bearing surfaces 1' and 2' to adjust the width of bearing space 4.

Blast pipe or air supply pipe 5' is secured to outer wall ring 5 of outer bearing element 1 so that compressed air can be fed into air passage 6 through the pipe. Additionally, air inlet member 10 having blast pipe or air supply pipe 10' attached to it is secured to an outer open end of inner bearing element 2 so that compressed air can be fed into air passage 9, which is defined by the hollow bore of inner bearing element 2.

Outer bearing element 1 preferably includes a plurality of axially extending longitudinal recesses or grooves 11 spaced along the circumference of outer bearing surface 1' of outer receiver section 1a. A plurality of nozzles of air inlet holes 11' are formed to fluidically connect grooves 11 to air passage 6 such that compressed air fed into air passage 6 can be dispersed into longitudinal grooves 11 via nozzles 11' so that the air will be jetted into bearing space 4 to create air films, i.e., laminae or cushions.

In similar fashion, inner bearing element 2 includes a plurality of longitudinal grooves 12 formed along the inner bearing surface 2' of inner receiver section 2a and also has a plurality of nozzles or air inlet holes 12' formed to open along grooves 12. In this fashion, compressed air fed into air passage 9 can be dispersed into longitudinal grooves 12 through nozzles 12' so that it will then be jetted into bearing space 4.

Shaft member 3 comprises a rotary shaft having a journaled member or section 13 adapted to be rotatably supported within the relatively thin bearing space 4. Journal member 13 can comprise either an integral portion of the shaft or can be a separate member secured to the shaft. In either event, the shaft and journal member combination has a substantially Y-shaped cross-sectional configuration. As illustrated in the preferred embodiment of the drawings, shaft 3 has a grinding spindle construction with grindstone 14 secured to one end of the shaft, e.g., by a tongue and groove joint.

Figure 4:
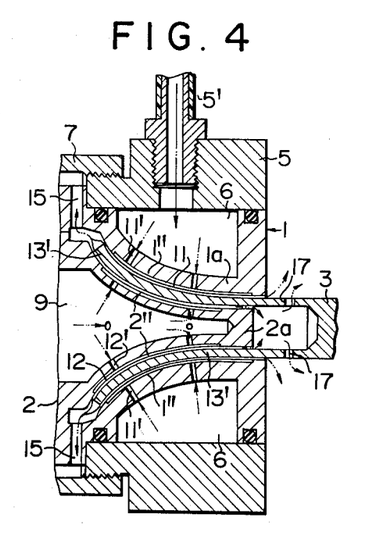
FIG. 4 is a vertical cross-sectional view similar to that of FIG. 1 of a second embodiment of the arrangement of the present invention.

Journal member 13 of shaft 3 has a substantially conical configuration which can be accomodated when it is positioned within bearing space 4. More particularly, it can be formed as a bell mouth which is enlarged or expanded at a free end and which has a uniform thickness, relatively thin wall over its entire surface. This structure is best illustrated in FIG. 4.

In setting shaft 3 in position within the bearing arrangement, fastening ring 7 is first removed and inner bearing element 2 is then pulled off from outer bearing element 1, into which shaft 3 is inserted, through barrel section 1b of the outer bearing element. This is achieved by directing one end of the shaft forwardly until journal part or member 13 is received within outer receiving section 1a of outer bearing element 1. Thereafter, inner bearing element 2 is reattached to outer bearing element 1 so that shaft 3 will be rotatably supported within bearing space 4.

Distinct exhaust or relief holes 15, 16 and 17 for compressed air are provided in the inner bearing element 2, ring 7 and shaft 3, respectively. As illustrated in FIG. 1, pulley 18 is provided for transmitting rotary power to shaft 3 via a belt drive.

In accordance with the bearing arrangement formed in accordance with the present invention, compressed air is dispersed into longitudinal grooves 12 through nozzles 11' and 12', which open along the outer and inner bearing surfaces 1' and 2' of outer and inner bearing elements 1 and 2, respectively. This air is jetted towards the outer and inner faces of journal member 13 to support this member within bearing space 4 in floating fashion. By floating fashion is meant that the journal member is rotatably positioned within the bearing space without contacting either the inner or outer bearing surfaces of the bearing elements. The journal member does not contact either of these surfaces at any point over its entire periphery. In this condition journal member 13 can be easily rotated. The compressed air creates air films or laminae which act as cushions for inserted journal members.

Figure 3:
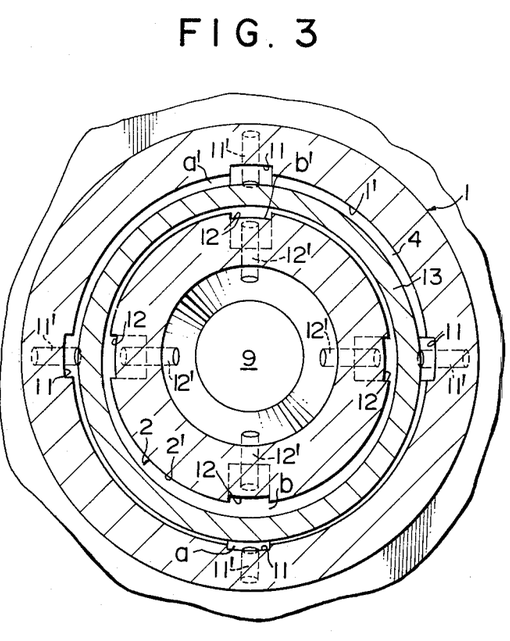
FIG. 3 is an enlarged cross-sectional view illustrating a pressure receiving condition of a journal member forming part of the arrangement of FIG. 1.

Pressure distribution within the arrangement is best illustrated in FIG. 3. In the event that journal member 13 is displaced laterally, e.g., downwardly as shown in FIG. 3, and eccentrically from the concentric axes of the outer and inner bearing elements 1 and 2, by a load applied to the journal member, the portion of the member which is displaced away from these axes will reduce gap (a) which exists between the outer face of the journal member and outer bearing surface 1'; simultaneously, gap (d) between the inner face of the journal member and inner bearing surface 2' will be expanded or enlarged and the opposite portion of journal member 13, which is displaced towards the axes, will reduce gap (b') between the inner face of the journal member and inner bearing surface 2' while expanding or enlarging gap (a') between the outer face of the journal member and outer bearing surface 1'. Air pressure will accordingly be raised or increased in the reduced gaps (a) and (b') while lowered or reduced in expanded or enlarged gaps (b) and (a').

Accordingly, journal member 13 is acted upon by a force which moves it into a normal position coaxial with outer and inner bearing elements 1 and 2, in an upward direction as shown in FIG. 3, the force being magnified by air pressure acting upon the outer and inner faces of journal member 13. Journal member 13 is automatically and rapidly regulated so as to have the coaxial relationship illustrated in FIG. 2, with balanced air pressure at both the inner and outer faces of journal member 13. In this fashion journal member 13 can be rotated in a substantially, completely contactless position between the two bearing surfaces.

Compressed air jetted into bearing space 4 is then directed through an annular gap contiguous with an open end of space 4, as shown by the arrows in FIG. 1, and is discharged outwardly through release holes 15, 16 and 17.

FIG. 4 illustrates a second embodiment of the arrangement of the present invention, in which journal member or section 13' of shaft 3 has a bell mouth configuration, i.e. it is gradually curved outwardly towards an enlarged free end. The free end of the bell mouth is that which is most deeply inserted into the bearing space.

In the embodiment of FIG. 4, outer bearing surface 1" of outer bearing element 1 and inner bearing surface 2" of inner bearing element 2 both have generally conical configurations which have curvatures similar to that of journal member 13'. In this manner, the bearing strength of the member against a load in the thrust direction is reinforced by the particular configuration of all of the bearing surfaces and journal members.

Figure 2:
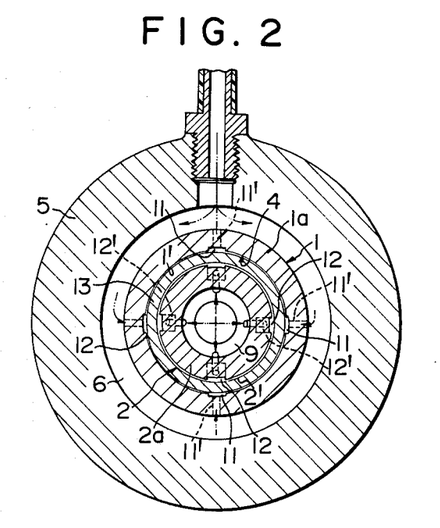
FIG. 2 is a cross-sectional view taken along line II—II of FIG. 1.

The arrangement illustrated in FIG. 4 is of similar construction to that illustrated in FIGS. 1-3, except for parts 1", 2" and 13'. Accordingly, like reference numerals have been assigned to like parts and their description has been omitted for convenience herein.

Figure 5:
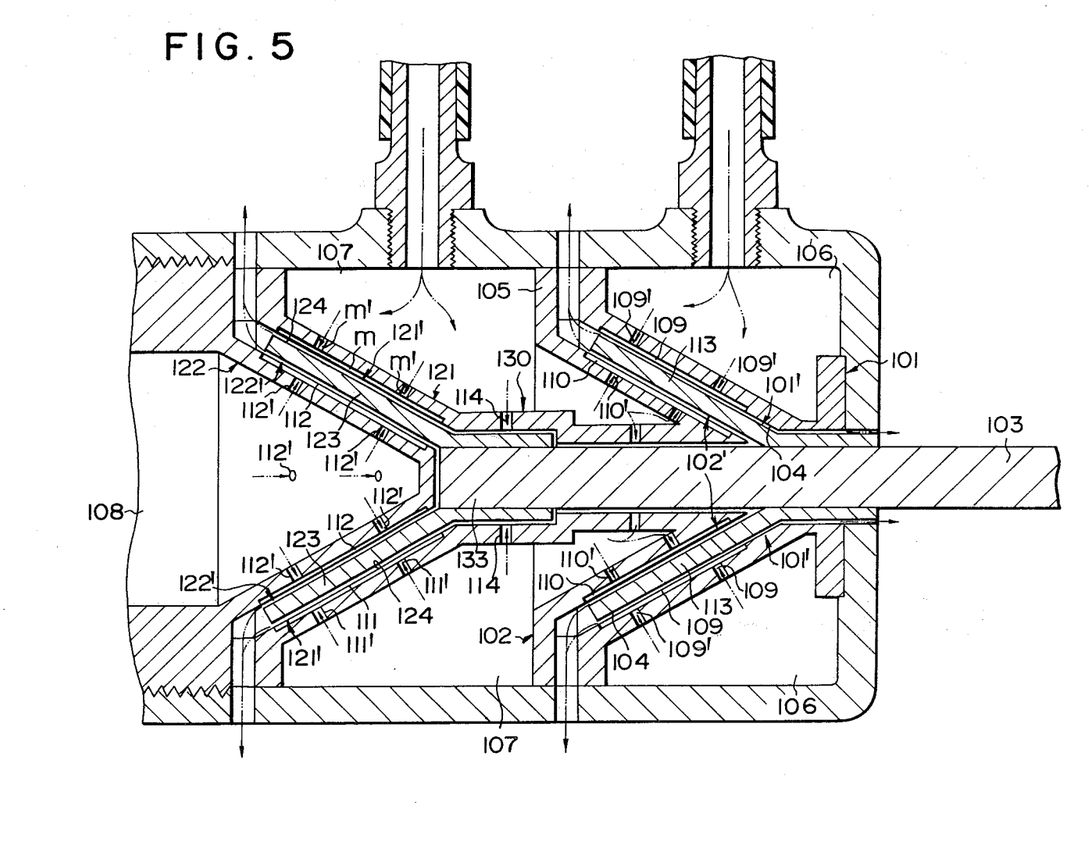
FIG. 5 is a similar, enlarged cross-sectional view of a third embodiment of the arrangement of the present invention.

FIG. 5 illustrates a third embodiment of the present arrangement which is formed, as illustrated, as a double bearing arrangement. This double bearing arrangement includes first outer bearing element 101 and first inner bearing element 102, shaft 103, second outer bearing element 121, second inner bearing element 122, first journal part or member 113 and second journal part or member 123. A first bearing space 104 of substantially conical configuration is formed between the first outer and inner bearing elements 101 and 102, respectively, while second bearing space 124 is defined by the area between second outer and inner bearing elements 121 and 122, respectively. The first and second bearing spaces 104 and 124 are desireably spaced from one another along the axial direction of the arrangement.

First inner bearing element 102 and second outer bearing element 121 may be formed in unitary fashion as bearing member 105 by utilization of a substantially barrel-shaped bearing section 130 which interconnects the two bearing elements.

Air passages 106, 107, and 108 are provided for the introduction and feeding of compressed air into the arrangement via nozzles 109', 111' and 112', respectively.

Bearing surfaces 101', 102', 121' and 122' of the bearing elements all include axially extending longitudinal grooves 109, 110, 111, and 112, respectively. Air inlet holes or nozzles 109, 110, 111 and 112, respectively, are open such that compressed air held within air passages 106 through 108 can be dispersed into respective longitudinal grooves 109 through 112 via the nozzles. In this fashion, the air is jetted as a film or films into bearing spaces 104 and 124 for rotatably supporting the journal members of the shaft within the space.

Bearing section 130 also includes nozzles or air inlet holes 114 which can be utilized to feed compressed air from air passage 107 into the inner space of bearing section 130.

Shaft 103 includes first journal member 113 and second journal member 123 which are accomodated within and supported for rotation by bearing spaces 104 and 124, respectively. Both of the journal members are integrally secured to shaft 103 in coaxial position by force fitting.

For the installation of shaft 103, which initially includes only first journal member 113 securely force fit thereupon, it is first inserted into outer bearing element 101. Bearing member 105 is then fitted onto shaft 103 such that first inner bearing element 102 is accomodated in position on first journal member 113. Second journal member 123 is then force fit onto the extreme end of shaft 103 and second inner bearing element 122 is placed into position within second journal member 123.

Journal section 133 of shaft 103 is located between first and second journal members 113 and 123 and is supported within bearing section 130.

In the embodiment of FIG. 5, compressed air is fed through longitudinal grooves 109, 110, 111, 112 and is jetted towards the outer and inner faces of both of first and second journal members 113 and 123 so as to rotatably support the journal members within respective bearing spaces 104 and 124; in this manner no point of the periphery of either of the journal members will contact any point on bearing surfaces 101', 102', 121' and 122', respectively. In this fashion, the journal members are arranged in contactless, floating position between the pairs of inner and outer bearing surfaces.

Shaft journal section 133 may also be supported by compressed air jetted into bearing section 130 via nozzles 114. Such journal section is not, however, essential to the pneumatic bearing arrangement comprising the present invention.

The bearing arrangement of this device includes a combination of substantially conical concave and convex bearing surfaces concentrically arranged to define therebetween a conical bearing space within which a conical journal member is accomodated and rotatably supported to achieve a bearing structure against a load having both radial and thrust components. Additionally, because the journal members are formed having generally conical configurations, their weight is considerably reduced in comparison with conventional journal members which are formed as part of a solid shaft. Furthermore, since compressed air is jetted to the opposed inner and outer faces of each journal member from nozzles which open along or adjacent to either the outer and inner bearing surfaces, the total pressure receiving area of each journal member becomes the total of the areas of the outer and inner faces of the journal members. This provides a considerable increase in the pressure receiving area of each journal member.

Accordingly, the shaft is provided with a load bearing structure against radial and thrust loads while at the same time being formed of reduced weight and having increased pressure receiving areas comprised by its journal member. The shaft is also provided with pressure receiving surfaces formed on both the opposed outer and inner faces of each journal member to provide the bearing arrangement with a lubricating structure which satisfies practical requirements. The balancing or stabilizing action of the compressed air which is jetted to opposed outer and inner faces of each journal member enables each journal member to be supported, maintained, or journaled in a substantially completely contactless position. Accordingly, abrasion of the bearing arrangement is remarkably reduced in comparison to abrasion which occurs in a conventional pneumatic bearing; the bearing arrangements of the present invention can be satisfactorily used for longer periods then those previously known, even with shafts which rotate at very high speeds, e.g., 150,000 r.p.m. or greater, some of which have not yet been attained.

Additionally, by considerably reducing the weight of each journal member, emergency operation of the shaft is improved, e.g., rotation starting performance and response for purposes of stopping the shaft are enhanced. The weight reduction also eliminates the necessity that a journal member have an excessively large diameter or length; in this fashion the present bearing arrangement can be formed relatively compact with respect to the shaft diameter.

Furthermore, the present bearing arrangement comprises an extra-high speed pneumatic bearing arrangement having a compact or extra-compact size and a long life which can be used in a wide range of applications in precision machinery, for aircraft, for nuclear power generating devices, and many other purposes.

The embodiment of the pneumatic bearing arrangement illustrated in FIG. 5, which includes a plurality of sets of bearing spaces and journal sections taken along the axial direction of the arrangement further increases the bearing strength of each journal member to loads which may be applied thereto, even in comparison with the first and second embodiments of the arrangement of the present invention. This may provide an even more useful pneumatic bearing arrangement.

From the foregoing description, one skilled in the art can easily ascertain the essential characteristics of this invention and, without departing from the spirit and scope thereof, can make various changes and modifications of the invention to adapt it to various useages and conditions.

What is claimed is:
1. A pneumatic bearing arrangement comprising:
 (a) an outer element have a generally conical configuration and a concave bearing surface;
 (b) an inner element having a generally conical configuration and a convex bearing surface, said elements disposed in generally concentric relation and defining a generally conical bearing space therebetween;
 (c) a plurality of nozzles on each of said elements, said nozzles opening adjacent to said bearing surfaces; and
 (d) a shaft having a generally conical journal member with an inner and an outer face, said shaft and journal member having a substantially Y-shaped cross sectional configuration, whereby said journal member is rotatably supported by said bearing space such that gaps exist both between said outer face and said concave bearing surface and between said inner face and said convex bearing surface, whereby when air is jetted into said bearing space through said nozzles air films maintain the journal floating between said bearing surfaces without contacting said bearing surfaces, said air film maintaining said journal member in a balanced, contactless, position even during the application of both thrust and radial loads.

2. A pneumatic bearing arrangement in accordance with claim 1 wherein said nozzles open along said bearing surfaces.

3. A pneumatic bearing arrangement in accordance with claim 1 wherein said nozzles open along longitudinal grooves formed on the bearing surfaces of said outer and inner elements.

4. A pneumatic bearing arrangement in accordance with claim 1 wherein said conical outer element, inner element and journal member all have a bell-shaped configuration having one outwardly flared end.

5. A pneumatic bearing arrangement in accordance with claim 1 wherein said journal member is hollow, said inner element further comprises a barrel-shaped section and said outer element further comprises a barrel-shaped section.

6. A pneumatic bearing arrangement in accordance with claim 5 wherein said outer element includes an annular groove about its outer periphery and wherein an outer wall ring is fitted about said groove in airtight fashion.

7. A pneumatic bearing arrangement in accordance with claim 6 further comprising threads on said outer wall ring and a fastening ring adapted to be threadedly secured to said wall ring, whereby when said rings are secured said elements are assembled into a fixed, integral structure.

8. A pneumatic bearing arrangement in accordance with claim 7 further comprising means for adjusting the width of said bearing space.

9. A pneumatic bearing arrangement in accordance with claim 8 wherein said adjusting means comprise adjusting screws screwed into said inner element and said fastening ring.

10. A pneumatic bearing arrangement in accordance with claim 9 further comprising air relief holes in said inner element, said fastening ring and said shaft.

11. A pneumatic bearing arrangement in accordance with claim 1 and further comprising a plurality of axially spaced sets of said elements forming an equal plurality of said bearing spaces and wherein said shaft has a plurality of generally conical journal members disposed at axially spaced positions along said shaft, each of said journal members being accomodated and rotatably supported in a respective one of said bearing spaces such that very small gaps exist between an outer face of each journal member and a corresponding one of said concave bearing surfaces and between an inner face of each member and a corresponding one of said convex surfaces, whereby when air is jetted into said bearing spaces air films are formed for maintaining the journal floating between the pairs of inner and outer bearing surfaces without contacting said bearing surfaces, said air films maintaining said journal members in balanced position even upon the application of both thrust and radial loads to said members.

12. A pneumatic bearing arrangement in accordance with claim 11 wherein said nozzles open along said bearing surfaces.

13. A pneumatic bearing arrangement in accordance with claim 11 wherein said nozzles open along longitudinal grooves formed on the bearing surfaces of each of said elements.

14. A pneumatic bearing arrangement in accordance with claim 11 wherein each of said generally conical outer elements, inner elements and journal members has a substantially bell-shaped configuration with a curved, outwardly extending portion at one end thereof.

15. A pneumatic bearing arrangement in accordance with claim 11 further comprising a barrel-shaped bearing section interconnecting said two elements.

16. A pneumatic bearing arrangement in accordance with claim 11 wherein one of said inner elements further comprises a barrel-shaped section and said outer elements include annular grooves about their outer peripheries, an outer wall ring fitted about each groove in air-tight condition.

17. A pneumatic bearing arrangement in accordance with claim 16 further comprising a fastening ring threadedly secured to said barrel-shaped section, said ring comprising means for adjusting the width of said bearing spaces.

18. A pneumatic bearing arrangement in accordance with claim 17 further comprising a plurality of air relief holes.

19. An arrangement of elements adapted to receive a shaft and journal member combination, the arrangement comprising:
(a) an outer element having a generally conical configuration and a concave bearing surface;
(b) an inner element having a generally conical configuration and a convex bearing surface, said elements disposed in generally concentric fashion and defining a generally conical bearing space therebetween;
(c) a plurality of nozzles on each of said elements, said nozzles opening adjacent to said bearing surfaces, whereby said elements are adapted to receive a generally cross-sectional Y-shaped shaft and journal member, the journal member having an inner face and an outer face and a generally conical configuration, the elements being adapted to accomodate and rotatably support said journal in said bearing space so that very small gaps will be left between the outer face and the concave bearing surface and between the inner face and the convex bearing surface such that when air is jetted into said bearing space through said nozzles and when said journal is supported therein, air films are created which are adapted to support the journal member in floating fashion between the bearing surfaces without contact between the surfaces and the journal member, the air films being adapted to maintain the journal member in a balanced position when it is so positioned even upon the application of both thrust and radial loads.

20. An arrangement in accordance with claim 19 wherein said nozzles open along said bearing surfaces.

21. An arrangement in accordance with claim 19 wherein said nozzles open along longitudinal grooves formed on the bearing surfaces of said outer and inner elements.

22. An arrangement in accordance with claim 19 wherein said generally conical outer and inner elements have a bell-shaped configuration having one outwardly flared end.

23. An arrangement in accordance with claim 19 wherein said journal member is hollow, said inner element further comprises a barrel-shaped section and said outer element further comprises a barrel-shaped section.

24. An arrangement in accordance with claim 23 wherein said outer element includes an annular groove about its outer periphery and wherein an outer wall ring is fitted about said groove in air-tight fashion.

25. An arrangement in accordance with claim 24 further comprising threads on said outer wall ring and a fastening ring adapted to be threadedly secured to said wall ring, whereby when said rings are secured said elements are assembled into a fixed, integral structure.

26. An arrangement in accordance with claim 25 further comprising means for adjusting the width of said bearing space.

27. An arrangement in accordance with claim 26 wherein said adjusting means comprise adjusting screws screwed into said inner element and said fastening ring.

28. An arrangement in accordance with claim 27 further comprising air relief holes in said inner element and said fastening ring.

29. An arrangement in accordance with claim 19 and further comprising a plurality of axially spaced sets of said elements forming an equal plurality of said bearing spaces which are adapted to receive a plurality of generally conical journal members disposed at axially spaced positions along said shaft, each of said journal members adapted to be accomodated and rotatably supported in a respective one of said bearing spaces such that very small gaps will exist between an outer face of each journal member and a corresponding one of said concave bearing surfaces and between an inner face of each member and a corresponding one of said convex surfaces when said members are so supported, whereby when air is jetted into said bearing spaces air films are formed which are adapted to maintain the journal floating between the pairs of inner and outer bearing surfaces without contacting said bearing surfaces, said air films being adapted to maintain said journal members in balanced position even upon the application of both thrust and radial loads to said members.

30. An arrangement in accordance with claim 29 wherein said nozzles open along said bearing surfaces.

31. An arrangement in accordance with claim 29 wherein each of said generally conical outer elements and inner elements has a substantially bell-shaped configuration with a curved, outwardly extending portion at one end thereof.

32. An arrangement in accordance with claim 29 further comprising a barrel-shaped bearing section interconnecting said two elements.

33. An arrangement in accordance with claim 29 wherein one of said inner elements further comprises a barrel-shaped section and said outer elements include annular grooves about their outer peripheries, an outer wall ring fitted about each groove in air-tight condition.

34. An arrangement in accordance with claim 3 further comprising a fastening ring adapted to be threadedly secured to said barrel-shaped section, said ring comprising means for adjusting the width of said bearing spaces.

35. An arrangement in accordance with claim 34 further comprising a plurality of air relief holes.

36. An arrangement in accordance with claim 29 wherein said journal member is hollow.

37. An arrangement in accordance with claim 19 wherein said nozzles open along longitudinal grooves formed on the bearing surfaces of each of said elements.

* * * * *

UNITED STATES PATENT AND TRADEMARK OFFICE
CERTIFICATE OF CORRECTION

PATENT NO. : 4,330,159
DATED : May 18, 1982
INVENTOR(S) : Mazakazu KAKIMOTO

It is certified that error appears in the above-identified patent and that said Letters Patent is hereby corrected as shown below:

Abstract, line 1, after "arrangement" insert --is provided--.

Column 2, line 6, "desireably" should be --desirably--.

Column 8, line 38, "desireably" should be --desirably--.

Column 9, line 65, "then" should be --than--.

Column 10, line 29, "useages" should be --usages--.

Signed and Sealed this

Tenth Day of August 1982

[SEAL]

*Attest:*

*Attesting Officer*

GERALD J. MOSSINGHOFF

*Commissioner of Patents and Trademarks*